B. O. NELSON.
BOOM ADJUSTER.
APPLICATION FILED MAR. 8, 1921.

1,414,890.

Patented May 2, 1922.
2 SHEETS—SHEET 1.

BERT O. NELSON
INVENTOR

BY Victor J. Evans
ATTORNEY

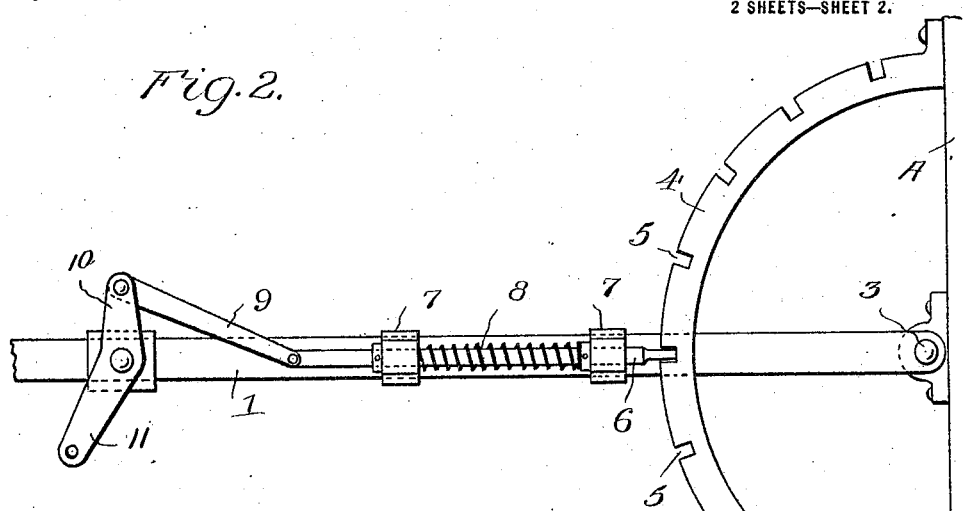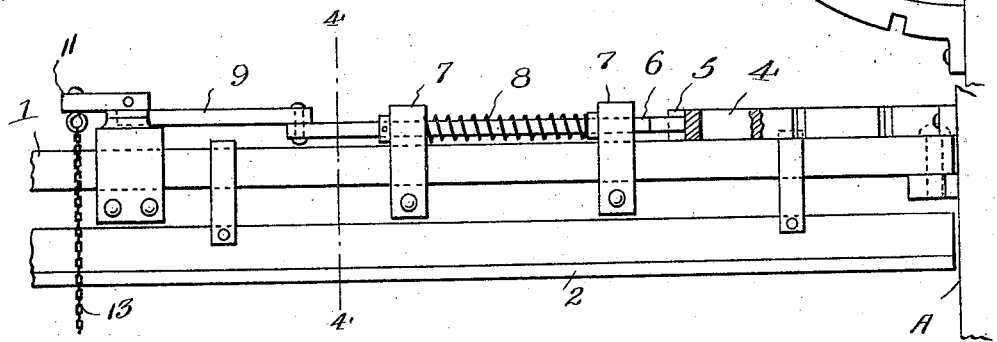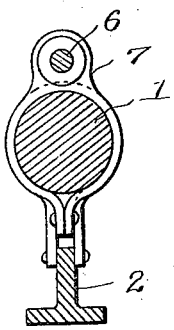

UNITED STATES PATENT OFFICE.

BERT O. NELSON, OF SCANDINAVIA, WISCONSIN.

BOOM ADJUSTER.

1,414,890. Specification of Letters Patent. Patented May 2, 1922.

Application filed March 8, 1921. Serial No. 450,549.

*To all whom it may concern:*

Be it known that I, BERT O. NELSON, a citizen of the United States, residing at Scandinavia, in the county of Waupaca and State of Wisconsin, have invented new and useful Improvements in Boom Adjusters, of which the following is a specification.

This invention relates to booms of conveyor structures such as commonly used on farms, dairies, or analogous places for conveying various types of material such as conveying manure from a barn or stable to the rotting pile, and an object of the invention is to provide means easily accessible for securely holding the boom in adjusted position.

In the present structure anchors are usually provided for securely holding the booms in adjusted positions and these anchors are carried by the free ends of the booms necessitating the operators walking across the rotting pile of manure to release the anchor for adjusting the position of the boom, which is not only a disagreeable operation but is time absorbing, and an object of the present invention is to overcome such disadvantages by providing a structure operable from the barn or stable door for holding the boom in adjusted positions.

Other objects of the invention will appear in the following detailed description and in the accompanying drawing wherein:

Fig. 2 is a detailed top plan of the boom adjuster and part of the boom.

Fig. 3 is an enlarged side elevation of the locking mechanism.

Fig. 4 is a detailed section on the line 4—4 of Fig. 3.

Figure 1:
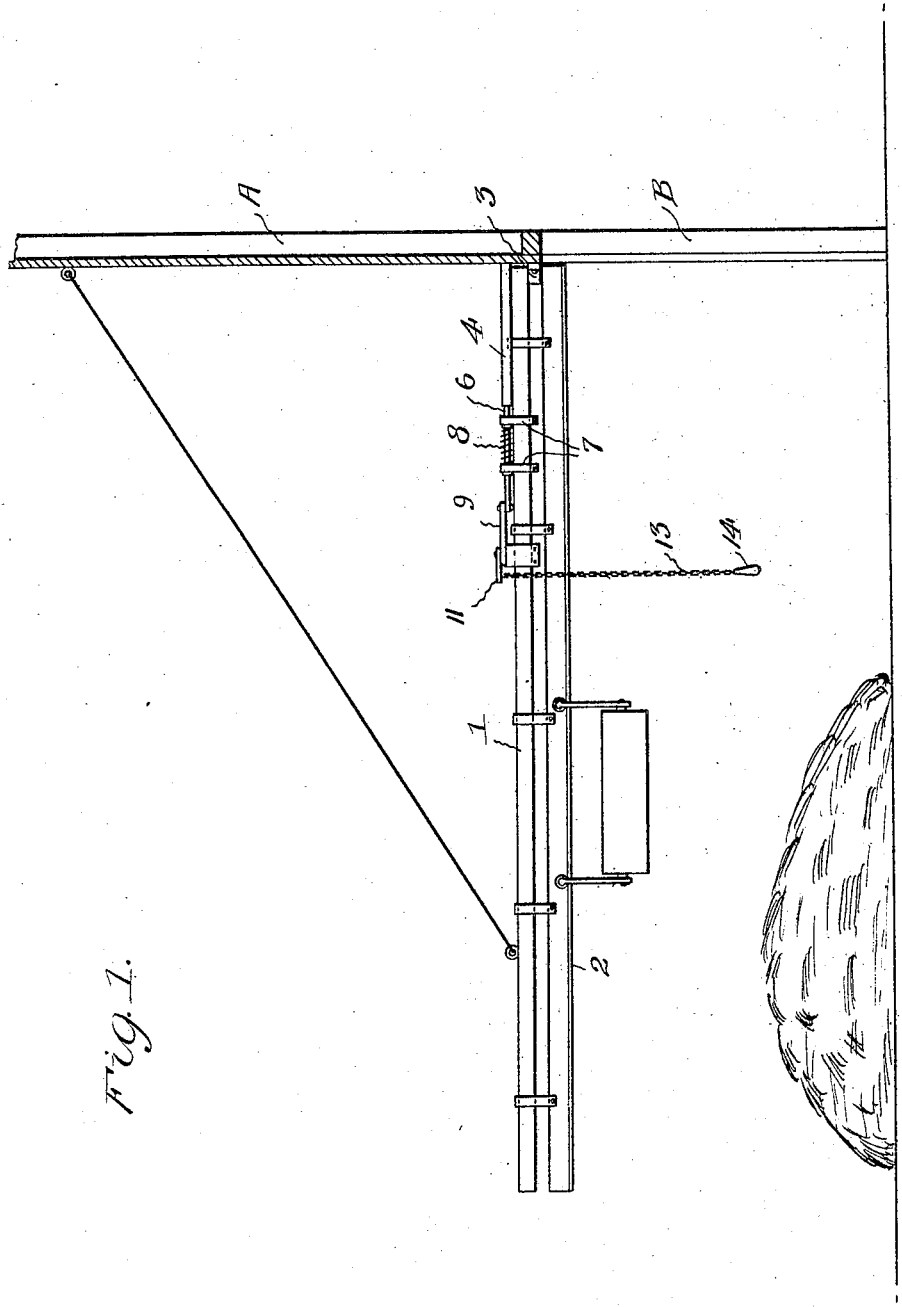
Fig. 1 is a fragmentary view of a barn showing the improved boom adjuster applied.

Referring more particularly to the drawing the boom 1 which carries the conveyor rail 2, is pivotally supported, in any suitable manner as shown at 3, to the building A at the door B and it is necessary at times to adjust the position of the boom 1 and rigidly maintain it in such adjusted positions, for which purpose a relatively large quadrant 4 is attached to the building A with the pivot of the boom 1 as its axis. The quadrant 4 is provided with the usual notches 5 spaced in predetermined desired distances which are adapted to receive the locking dog 6 slidably supported on the boom 1 by suitable supports 7. A spring 8 is coiled about the locking dog 6 between the supports 7 and normally urges the dog into one of the notches 5. A link 9 is connected to the dog 6 and to a bell crank lever 10 rockably supported upon the boom 1. The arm 11 of the bell crank lever 10 has a chain or flexible member 13 connected thereto upon the free end of which a handle 14 is mounted to facilitate the pulling of the chain for rocking the bell crank 10 to slide the locking dog 6 out of one of the notches 5 to permit adjustment of the boom 1.

As shown in the drawing, the chain 13 is positioned so that the handle 14 thereon can be readily and conveniently reached from the door B and the boom released for adjustable pivotal movement from the door B.

It is, of course, to be understood that the invention may be constructed in various other manners and the parts associated in different relations and, therefore, I do not desire to be limited in any manner except as set forth in the claims hereunto appended.

Having thus described by invention what I claim is:

1. In a device as set forth, the combination, with a pivoted boom, of a quadrant, a slidable locking dog carried by said boom and adapted to engage said quadrant locking the boom in adjusted positions, a bell crank carried by said boom, a link connecting said bell crank and dog, and flexible means connected to said bell crank for locking it.

2. In a device as set forth, the combination, with a pivoted boom, of a quadrant, a slidable locking dog carried by said boom and adapted to engage said quadrant locking the boom in adjusted positions, a bell crank carried by said boom, a link connecting said bell crank and dog, flexible means connected to said bell crank for locking it, and a spring on said dog for arranging the dog into locking position relative to said quadrant.

In testimony whereof I affix my signature.

BERT O. NELSON.